United States Patent Office 3,341,520
Patented Sept. 12, 1967

3,341,520
CERTAIN PYRIDOBENZOTHIADIAZEPINE DERIVATIVES
Heinz Arthur Pfenninger, Ossining, N.Y., assignor to Geigy Chemical Corporation, Greenburgh, N.Y., a corporation of Delaware
No Drawing. Filed June 23, 1965, Ser. No. 466,412
37 Claims. (Cl. 260—239.3)

This application is a continuation-in-part of my copending application, S.N. 340,542, filed Jan. 27, 1964, now abandoned.

This invention relates to new and useful pyridobenzothiadiazepine compounds and particularly to 6,6,12-trioxo-1,2,3,11,12,12a-hexahydro - 4H - pyrido[1,2-b]-1,2,5-benzothiadiazepines, which possess valuable pharmacological properties and are useful as pharmaceutical agents. The present invention pertains further to methods for producing such compounds and to novel intermediates useful in the preparation of such compounds.

More particularly, the compounds of one aspect of this invention may be represented by the following structural formula:

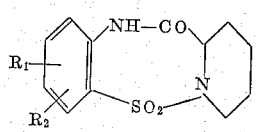

(I)

wherein $R_1$ and $R_2$ each stand for hydrogen, halogen (particularly chlorine and bromine), trifluoromethyl, nitro, amino, lower alkyl, lower alkoxy or methylenedioxy.

The term "lower alkyl" as used herein per se and as included in the term "lower alkoxy" means saturated monovalent aliphatic radicals of the general formula $-C_mH_{2m+1}$ wherein $m$ designates an integer of less than six and is inclusive of both straight-chain and branched-chain radicals, such as, methyl, ethyl, n-propyl, isopropyl, butyl, isobutyl, tertiary, butyl, n-amyl, etc.

The compounds of Formula I are produced by reacting lower alkylpipecolinates and appropriately substituted o-nitrobenzene sulfonylhalides in such inert solvents as methylene chloride, benzene, toluene, xylene, etc., in the presence of base. The base can be provided either by using an excess of lower alkylpipecolinate or by adding such bases as tri(lower)alkylamine (particularly triethylamine), pyridine, di(lower)alkylaniline, etc. The lower alkyl N-[o-nitrobenzenesulfonyl]pipecolinates thus obtained can be conveniently reduced with hydrogen in the presence of Raney nickel or platinum on carbon at atmospheric pressure and room temperature to yield the corresponding lower alkyl N-[o-aminobenzenesulfonyl]pipecolinates as intermediates. The intermediate lower alkyl N-[o-aminobenzenesulfonyl]pipecolinates can be saponified to the corresponding free acids and the latter closed to the desired pyridobenzothiadiazepine ring system by treating them with thionyl chloride or phosphorus trichloride, or phosphorus pentachloride in such solvents as chloroform, methylene chloride, etc., at reflux temperature.

This synthesis may be graphically illustrated by the following equations:

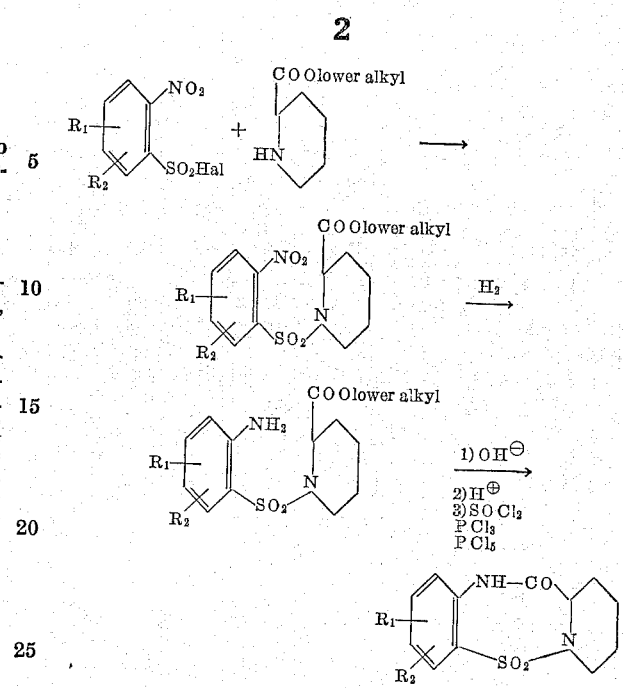

The symbols $R_1$ and $R_2$ have the significance ascribed to them hereinabove and Hal represents halogen, particularly, chlorine or bromine.

Alternatively, the intermediate lower alkyl N-[o-aminobenzenesulfonyl]pipecolinates may also be cyclized directly to the pyridobenzothiadiazepine system by reacting the former with strong bases, such as butyl lithium, sodium hydride, etc., in inert solvents, such as, benzene, toluene, hexane, etc.

Lower alkylpipecolinates and substituted o-nitrobenzenesulfonylhalides employed as starting materials in the above described synthesis are either commercially available or are obtainable from available chemicals in accordance with preparative methods in the prior art.

In another aspect, this invention concerns compounds which may be represented by the following structural formula:

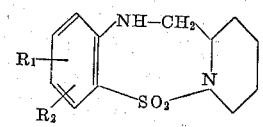

II wherein $R_1$ and $R_2$ each represent hydrogen, halogen (particularly chlorine and bromine), trifluoromethyl, lower alkyl, lower alkoxy or methylenedioxy, amino and nitro.

Compounds of Formula II can usually be produced by reducing compounds of Formula I, dissolved in an appropriate solvent, such as, tetrahydrofuran, etc., in the presence of lithium aluminum hydride.

In addition the reduction may be effected by the use of sodium borohydride and aluminum chloride.

A further method of reducing the compounds of Formula I to the compounds of Formula II, and which is the preferred method, is to carry out the reduction with diborane in tetrahydrofuran or the like.

Another way of obtaining the compounds of Formula II from the compounds of Formula I is to form the thioamide by treatment with phosphorus pentasulfide and pyridine, and thereafter to desulfurize with Raney nickel to yield the compounds of Formula II.

As mentioned above, the subject compounds, that is, compounds of Formulae I and II, possess valuable pharmacological properties; they can be characterized as diuretic and hypotensive agents.

Merely by way of illustration, 9 - trifluoromethyl-6,6,12 - trioxo - 1,2,3,11,12,12a - hexahydro(4H)pyrido[1,2-b]-1,2,5 - benzothiadiazepine exhibited diuretic activity in the mouse at a dose of 250 mg./kg. p.o. and at a dose of 300 mg./kg. in the cat when administering the compound into the gut.

Hypertensive effects were noted when an i.v. dose of 3 mg./kg. 8,9 - dimethoxy-6,6,12-trioxo - 1,2,3,11,12,12a-hexahydro - 4H - pyrido - [1,2-b]-[1,2,5] - benzothiadiazepine was administered to anesthetized cats.

A hypotensive reaction was observed when an i.v. dose of 3 mg./kg. of 9-methoxy - 6,6,12-trioxo-1,2,3,11,12,12a-hexahydro - 4H - pyrido - [1,2,-b]-[1,2,5]-benzothiadiazepine was administered to anesthetized cats.

The compounds of both aspects of this invention, as well as intermediates therefor, together with the modes of synthesis, may be more fully illustrated by the following examples. The scope of the invention is, however, not limited thereto.

In these examples, the following nomenclature is used:

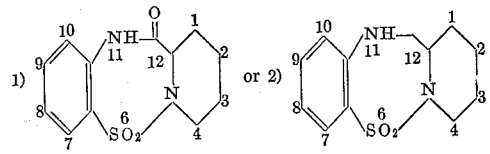

(1) 6,6,12 - trioxo - 1,2,3,11,12,12a - hexahydro - 4H-pyrido[1,2-b] - 1,2,5 - benzothiadiazepine or (2) 6,6-dioxo - 1,2,3,11,12,12a - hexahydro - 4H - pyrido[1,2-b] 1,2,5-benzothiadiazepine.

PREPARATION OF 2-NITROBENZENESULFONYL-CHLORIDES

A. 2-nitrobenzenesulfonylchloride

This compound is available commercially and/or may readily be prepared by those skilled in the art.

B. 6-chloro-2-nitrobenzenesulfonylchloride 125 g. 2 - benzylthio - 3 - chloronitrobenzene was suspended in 1400 ml. 90% acetic acid. While stirring chlorine gas was bubbled through the mixture at a rate that kept the internal reaction temperature below 55° C. When the reaction mixture started to cool down, it was flushed with nitrogen to remove excess chlorine. The solution obtained was then filtered through a glass filter disc and the solvent removed from the filtrate under reduced pressure. The remaining oil crystallized from ethanol. Yield: 67.4 g. (61%); M.P. 81.5–82.5° C.

C. 5-chloro-2-nitrobenzenesulfonylchloride 162.8 g. 2 - benzylthio - 4 - chloro - nitrobenzene was suspended in 500 ml. 90% acetic acid and while stirring, a stream of chlorine gas was bubbled through the mixture at such a rate as to maintain a reaction temperature of 50–55° C. The starting material dissolved during this procedure. When no more chlorine was absorbed and the reaction temperature started to drop, a stream of nitrogen was introduced to remove excess chlorine. The reaction mixture was then filtered and the solvent removed under reduced pressure. The residual oil was dissolved in ethyl acetate, washed with saturated sodium bicarbonate solution, dried over sodium sulfate, filtered, and the solvent was removed under reduced pressure. Yield of residual yellow oil: 129.1 g. (93.5%).

D. 4-chloro-2-nitrobenzenesulfonylchloride

A stream of chlorine gas was introduced into a stirred mixture of 100 g. 4,4' - dichloro - 2,2' - dinitrodiphenyl-disulfide and 400 ml. 90% acetic acid at such a rate as to maintain a temperature of 50–55° C. After about 1½ hour all the disulfide was dissolved and the temperature dropped. A stream of nitrogen was introduced to remove chlorine, the reaction mixture then filtered and the solvent evaporated under reduced pressure. The remaining oil was extracted with toluene, the toluene layer dried and taken to dryness. The residual oil crystallized. It was recrystallized three times from cyclohexane. Yield: 100 g. (75%); M.P. 75–77.5° C.

E. 2-nitro-4-trifluoromethylbenzenesulfonylchloride

Prep. see C. F. Holdreye, R. B Babel, L. C. Cheney; JACS 81, 4807 (58).

F. 4-methyl-2-nitrobenzenesulfonylchloride 19.6 g. 4-benzylthio-3-nitrotoluene was suspended in 150 ml. 90% acetic acid. Chlorine was bubbled into the stirred mixture at such a rate that the temperature of the reaction mixture remained below 55° C. After no more chlorine was absorbed, the reaction mixture was allowed to cool to room temperature and filtered through a glass filter disc. The clear filtrate was concentrated under reduced pressure until all acetic acid was removed. The oil obtained was dissolved in chloroform, the chloroform solution washed with bicarbonate solution and then dried over sodium sulfate.

G. 4-methoxy-2-nitrobenzenesulfonylchloride 17.1 g. 2-benzylthio-5-methoxynitrobenzene was dissolved in 135 ml. 90% acetic acid and chlorine bubbled into this solution with stirring at such a rate as to keep the temperature below 55° C. When no more chlorine was absorbed and the reaction mixture cooled down to room temperature, it was flushed with nitrogen, filtered through a glass filter disc and the acetic acid was evaporated under reduced pressure. The oil obtained was crystallized from ethanol with charcoal treatment. Yield: 7.7 g. (48.7%); M.P. 80–81° C.

H. 4,5-dimethoxy-2-nitrobenzenesulfonylchloride 10 g. 2-benzylthio-4,5-dimethoxynitrobenzene was suspended in 70 ml. 90% acid. A stream of chlorine was introduced into the stirred solution until no more gas was absorbed. The reaction temperature was kept below 55° C. and dropped when the reaction was complete. Excess chlorine was flushed out with a stream of nitrogen. The mixture obtained was heated to about 45° C. and filtered hot through a glass filter disc. The filtrate was taken to dryness and the solid residue obtained recrystallized from ethanol. Yield: 4.6 g. (50%); M.P. 134–136° C.

The 2-benzylthio-4,5-dimethoxynitrobenzene employed in the preparation of the foregoing compound was synthesized as follows: 1.36 g. benzylmercaptan was dissolved in 30 ml. anhydrous ethanol and a solution of 0.4 g. sodium hydroxide in 3 ml. water was added to it. This mixture was poured into a hot solution of 2.18 g. 4-chloro-5-nitroveratrole in 20 ml. anhydrous ethanol. The yellow solution obtained was refluxed on a steam bath for 10 minutes. During this period, the yellow reaction product began to crystallize and was filtered off after the reaction mixture had reached room temperature. The obtained yellow crystals were recrystallized from ethanol. Yield: 2.45 g. (80.5%); M.P. 178°.

*Analysis.*—For $C_{15}H_{15}NO_4S$ (M.W. 305.35)—Calc'd: 58.99; H, 4.95; N, 4.59; S, 10.50%. Found: C, 58.87; H, 4.90; N, 4.69; S, 10.56%.

I. 4,5-methylenedioxy-2-nitrobenzenesulfonylchloride

Chlorine was bubbled into a stirred suspension of 54.5 g. 2-benzylthio-4,5-methylenedioxynitrobenzene in 500 ml. 90% acetic acid at such a rate as to maintain a reaction temperature of 50–55° C. When no more chlorine was absorbed and the reaction temperature dropped to room temperature, nitrogen was introduced to remove excess chlorine. The reaction mixture was filtered and the solvent removed under reduced pressure. The residual oil was crystallized from ethanol. Yield: 34.4 g. (69%); M.P. 94–95° C.

The 2-benzylthio-4,5-methylenedioxynitrobenzene employed in the preparation of the foregoing compound was synthesized as follows: 49.8 g. 6-chloro-3,4-methylenedioxy-nitrobenzene was dissolved in 250 ml. anhydrous hot ethanol and to this solution was added a mixture of 33 ml. benzylmercaptan, 73 ml. 3,3 N sodium hydroxide solution and enough anhydrous ethanol to give a clear solution. The reaction mixture was allowed to reach room temperature and then cooled down to −20° C. The precipitated yellow solid was filtered off and washed with ethanol. Yield: 54.5 g. (76%); M.P. 182–183° C.

*Analysis.*—For $C_{14}H_{11}NO_4S$ (MW. 289.31)—Calc'd: C, 58.12; H, 3.83; S, 10.09%. Found: C, 58.00; H, 3.82; S, 10.92%.

PREPARATION OF ALKYL N-(2-NITROBENZENESULFONYL) PIPECOLINATES AND ALKYL N-(2-AMINOBENZENESULFONYL)PIPECOLINATES

EXAMPLE I

*Ethyl N-(2-nitrobenzenesulfonyl)pipecolinate*

19 g. 2-nitrobenzenesulfonylchloride was dissolved in 100 ml. methylenechloride and to this solution was added with stirring at 0° C. a solution of 34.3 g. ethyl pipecolinate in 100 ml. methylene chloride. After complete addition, the reaction mixture was stirred for one hour at 0° C. and then the precipitated ethyl pipecolinate hydrochloride filtered off. The filtrate was taken to dryness and the obtained residue recrystallized three times from ethanol (or methanol). Yield: 24 g. (70.5%); 110–111° C.

*Analysis.*—For $C_{14}H_{18}N_2O_6$ (M.W. 342.30)—Calc'd: C, 49.12; H, 5.30; N. 8.18; S, 9.34%. Found: C, 48.92; H, 5.25; N, 8.41; S, 9.49%.

Alternatively, the condensation product can also be prepared in the following way.

To a stirred solution of 31.4 g. ethyl pipecolinate and 30 ml. triethylamine in 800 ml. methylene chloride was rapidly added at 25° C. a solution of 44.3 g. 2-nitrobenzenesulfonylchloride in 200 ml. methylene chloride. The reaction mixture began to reflux and was stirred until it reached room temperature again. The orange solution obtained was washed with 2 N hydrochloric acid and water, then dried over sodium sulfate and after filtration, concentrated under reduced pressure. The residual solid was recrystallized from methanol. Yield of the desired product as a white crystalline solid: 59.6 g. (87%); M.P. 110–111° C.

*Analysis.*—For $C_{14}H_{18}N_2O_6S$ (M.W. 342.30)—Calc'd: C, 49.12; H, 5.30; N, 8.18; S, 9.34%. Found: C, 48.92; H, 5.25; N, 8.41; S, 9.49%.

EXAMPLE II

*Ethyl N-(4-chloro-2-nitrobenzene-sulfonyl)pipecolinate*

To a stirred solution of 10.2 g. 4-chloro-2-nitrobenzene-sulfonylchloride in 50 ml. methylenechloride. 13.7 g. ethylpipecolinate was added at room temperature. The reaction proceeded with the evolution of considerable heat. Stirring was continued for one hour at room temperature and the precipitate which formed filtered off. The organic filtrate was washed with water, dried over $Na_2SO_4$ and taken to dryness. The residue crystallized and it was recrystallized from ethanol; M.P. 88–89° C.

*Analysis.* — For $C_{14}H_{17}ClN_2O_6S$ (MW. 376.70) — Calc'd: C, 44.60; H, 4.56; Cl, 9.41; S, 8.51%. Found: C, 44.65; H, 4.45; Cl, 9.39; S, 8.58%.

EXAMPLE III

*Ethyl N-(5-chloro-2-nitrobenzenesulfonyl)pipecolinate*

50.0 g. ethyl pipecolinate and 50.0 ml. triethylamine were dissolved in 200 ml. chloroform and to this solution at room temperature was added a solution of 81.7 g. 5-chloro-2 - nitrobenzenesulfonylchloride. The reaction mixture started to reflux and was allowed to reach room temperature again. It was then washed with 1 N hydrochloric acid, water, 30% potassium carbonate solution, and water again, dried over sodium sulfate and the solvent removed under reduced pressure. The residue was recrystallized from ethanol. Yield: 29.7 g. (25%); M.P. 118–119° C.

*Analysis.*—For $C_{14}H_{17}ClN_2O_6S$ (M.W. 376.70)— Calc'd: C, 44.60; H, 4.56; Cl, 9.41%. Found: C, 44.72; H, 4.68; Cl, 9.45%.

EXAMPLE IV

*Ethyl N-(2-chloro-6-nitrobenzenesulfonyl)pipecolinate*

75 g. 2-chloro-6-nitrobenzenesulfonylchloride was dissolved in 700 ml. chloroform and the solution obtained added slowly to a stirred solution of 50 g. ethyl pipecolinate and 95 ml. triethyl amine in 500 ml. chloroform. When the reaction mixture had reached room temperature again, it was washed with 2 N hydrochloric acid and water, dried over sodium sulfate, filtered and the solvent removed under reduced pressure. The solid obtained was recrystallized from ethanol with charcoal treatment. Yield: 33.75 g. (29.4%); M.P. 124–125° C.

*Analysis.*—For $C_{14}H_{17}ClN_2O_6S$ (M.W. 376.70)— Calc'd: C, 44.61; H, 4.55; N, 7.44; S, 8.51; Cl, 9.41%. Found: C, 44.46; H, 4.37; N, 7.39; S, 8.62; Cl, 9.53%.

EXAMPLE V

*Ethyl N-(4-trifluoromethyl-2-nitro-benzenesulfonyl)pipecolinate*

To a solution of 8.6 g. 4-trifluoromethyl-2-nitrobenzenesulfonylchloride in 50 ml. methylene chloride was added with stirring 10 g. of ethyl pipecolinate. The mixture heated rapidly up to the boiling point and the pipecolinate hydrochloride began to precipitate. After stirring for one hour at room temperature, the reaction mixture was filtered, the filtrate washed with water, dried over $Na_2SO_4$ and taken to dryness. The solid residue was recrystallized from ethanol. Yield: 11.1 g. (90%); M.P. 89.5–90.5° C.

*Analysis.*—For $C_{15}H_{17}F_3N_2O_6S$ (M.W. 410.25)— Calc'd: C, 43.87; H, 4.18; N, 6.83; S, 7.82%. Found: C, 44.28; H, 4.23; N, 6.89; S, 7.55%.

EXAMPLE VI

*Ethyl N-(4-methyl-2-nitrobenzenesulfonyl)-pipecolinate*

The chloroform solution (about 150 ml.) of the sulfonyl chloride obtained from 19.6 g. 4-benzenylthio-3-nitrotoluene (above) was added rapidly to a stirred solution of 9.7 g. ethyl pipecolinate and 14 ml. triethylamine in about 50 ml. chloroform. The sulfonamide formation generated heat. The reaction mixture was stirred at room temperature for 2 hours, then washed with 2 N hydrochloric acid and water, and dried over sodium sulfate. The filtered solution was taken to dryness and the crystalline residue recrystallized from ethanol. Yield: 15.1 g. (58.5%); M.P. 90–91° C.

*Analysis.*—For $C_{15}H_{20}N_2O_6S$ (M.W. 356.39)—Calc'd: C, 55.21; H, 6.80; N, 8.59; S, 9.83%. Found: C, 55.51; H, 6.63; N, 8.58; S, 9.91%.

EXAMPLE VII

*Ethyl N-(4-methoxy-2-nitrobenzenesulfonyl)pipecolinate*

20.30 g. ethyl pipecolinate and 30 ml. triethylamine was dissolved in 200 ml. chloroform. With stirring, a solution of 28.05 g. 4-methoxy-2-nitrobenzene-sulfonylchloride in 300 ml. chloroform was added. The mixture obtained was refluxed for 30 minutes, cooled to room temperature, washed with 2 N HCl and water, and dried over sodium sulfate. After filtration, the solvent was removed under reduced pressure and the oil obtained crystallized and recrystallized from ethanol. Yield: 26.73 g. (63.5%); M.P. 78–79° C.

*Analysis.*—For $C_{15}H_{20}N_2O_7S$ (M.W. 372.39)—Calc'd: C, 48.39; H, 5.41; N, 7.52; S, 8.61%. Found: C, 48.30; H, 5.11; N, 7.57; S, 8.69%.

EXAMPLE VIII

Ethyl N-(4,5-dimethoxy-2-nitrobenzene-sulfonyl)pipecolinate

A solution of 4.69 g. 4,5-dimethoxy-2-nitrobenzene-sulfonylchloride in 40 ml. chloroform was added rapidly to a stirred solution of 2.7 g. ethyl pipecolinate and 4 ml. triethylamine in 40 ml. chloroform. The reaction mixture was then heated to the boiling point and afterward allowed to cool to room temperature. The reaction mixture was washed with 2 N hydrochloric acid and water, dried over sodium sulfate, filtered and the solvent removed under reduced pressure. The residual oil was crystallized and recrystallized from ethanol. Yield: 4.68 g. (70%); M.P. 136–137° C.

*Analysis.*—For $C_{16}H_{22}N_2O_8S$ (M.W. 402.42)—Calc'd: C, 67.76; H, 5.51; N, 6.96; S, 7.97%. Found: C, 67.51; H, 5.44; N, 7.11; S, 8.04%.

EXAMPLE IX

Ethyl N-(4,5-methylenedioxy-2-nitrobenzene-sulfonyl)pipecolinate

To a solution of 20.3 g. ethyl pipecolinate and 20 ml. triethylamine in 100 ml. chloroform was added a suspension of 34.3 g. 4,5-methylenedioxy-2-nitrobenzene-sulfonylchloride in 150 ml. chloroform. The reaction mixture was heated to the boiling point and then allowed to reach room temperature again. It was then washed with 1 N hydrochloric acid and water, and the organic layer was dried over sodium sulfate, filtered and the solvent removed under reduced pressure. The residual oil was crystallized from ethanol. Yield: 47.0 g. (87%); M.P. 119–120° C.

*Analysis.*—For $C_{15}H_{18}N_2O_8S$ (M.W. 386.38)—Calc'd: C, 46.62; H, 4.70; S, 8.32%. Found: C, 46.81; H, 4.65; S, 8.32%.

EXAMPLE X

Isopropyl N-(4-chloro-2-nitrobenzenesulfonyl)-pipecolinate

The isopropyl ester of pipecolinic acid was prepared as follows: 53.2 g. pipecolinic acid was suspended in 500 ml. anhydrous isopropanol. A stream of anhydrous hydrogen chloride was introduced into the stirred mixture until a clear solution was obtained, cooled to room temperature, and the excess solvent removed under reduced pressure. The residual white solid ester hydrochloride was dissolved in 300 ml. ice-water mixture and the solution obtained was made alkaline with 30% potassium carbonate solution at 0° C. The free base was extracted with benzene and ether, the combined organic solutions dried over sodium sulfate, filtered, and the solvent removed under reduced pressure. The residual oil was distilled under reduced pressure. Yield: 54 g. (76%); B.P. 108–109°/20 mm. Hg; $[n]_D^{25°} = 1.4498$.

*Analysis.*—For $C_9H_{17}NO_2$ (M.W. 171.23)—Calc'd: C, 63.14%; H, 10.01%. Found: C, 62.97%; H, 9.77%.

To a stirred mixture of 33.6 g. isopropyl pipecolinate, 45 ml. triethylamine and 250 ml. chloroform was added to a solution of 43.2 g. 4-chloro-2-nitrobenzenesulfonyl-chloride in 750 ml. chloroform. The reaction was exothermic and was stirred until it reached room temperature again. It was then washed with 2 N hydrochloric acid and water, dried over sodium sulfate, filtered, and the solvent removed under reduced pressure. The residual dark oil was dissolved in a small amount of hot ethanol, heated wtih charcoal and filtered. Upon cooling, the desired nitroester crystallized. It was recrystallized from ethanol. Yield: 35.0 g. (58.3%); M.P. 110–111° C.

*Analysis.*—For $C_{15}H_{19}ClN_2O_6S$ (M.W. 390.84)—Calc'd: C, 46.11%; H, 4.90%; N, 7.17%; S, 8.20%; Cl, 9.07%. Found: C, 45.94%; H, 4.75%; N, 7.19%; S, 8.23%; Cl, 9.16%.

EXAMPLE XI

Ethyl N-(2-aminobenzenesulfonyl)pipecolinate 4 g. ethyl N-(2-nitrobenzenesulfonyl)pipecolinate was dissolved in 300 ml. ethanol. 5 g. of Raney nickel (wet) was added and the mixture was hydrogenated under atmospheric pressure. After the hydrogen uptake stopped (in about 30 minutes), the reaction mixture was filtered, the residual nickel washed thoroughly with ethanol and the filtrate taken to dryness. The solid residue was recrystallized 3 times from ethanol-water (50%). Yield: 3.8 g. (95%); M.P. 112.5–113.5° C.

*Analysis.*—For $C_{14}H_{20}N_2O_4S$ (M.W. 312.22)—Calc'd: C, 53.84%; H, 6.45%; N, 8.97%; S, 10.25%. Found: C, 53.66%; H, 6.29%; N, 9.09%; S, 10.52%.

EXAMPLE XII

Ethyl N-(6-amino-2-chloro-benzenesulfonyl)pipecolinate 33.75 g. ethyl N-(2-chloro-6-nitrobenzenesulfonyl)pipecolinate was dissolved in 1500 ml. ethanol, Raney nickel was added (about 30 g. wet) and the mixture hydrogenated at atmospheric pressure and room temperature. The hydrogen uptake stopped after one hour (total uptake 7400 ml.). The reaction mixture was filtered, the solvent recovered and the residue recrystallized from ethanol with charcoal treatment. Yield: 29.3 g. (94%); M.P. 136–137° C.

*Analysis.*—For $C_{14}H_{19}ClN_2O_4S$ (M.W. 346.85)—Calc'd: C, 48.67%; H, 5.52%; N, 8.08%; S, 9.25%; Cl, 10.22%. Found: C, 48.70%; H, 5.43%; N, 7.86%; S, 9.31%; Cl, 10.49%.

EXAMPLE XIII

Ethyl N-(2-amino-5-chlorobenzenesulfonyl)pipecolinate 29.0 g. ethyl N-(5-chloro-2-nitrobenzenesulfonyl)pipecolinate was dissolved in hot isopropanol and cooled rapidly to room temperature. About 29 g. wet Raney nickel was added and the mixture hydrogenated at room temperature under atmospheric pressure. The hydrogen uptake stopped after 5600 ml. gas was consumed. The reaction mixture was heated to the boiling point and filtered hot. The solvent was removed from the filtrate under reduced pressure and the white solid obtained was recrystallized from ethanol. Yield: 26.0 g. (97.7%); M.P. 165–166° C.

*Analysis.*—For $C_{14}H_{19}ClN_2O_4S$ (M.W. 346.9)—Calc'd: C, 48.48%; H, 5.52%; Cl, 10.22%. Found: C, 48.31%; H, 5.65%; Cl, 10.02%.

An alternative synthesis of ethyl N-(2-amino-5-chloro-benzenesulfonyl)pipecolinate is as follows: 15.60 g. ethyl N-(2-aminobenzenesulfonyl)pipecolinate was dissolved in 150 ml. carbon tetrachloride and 6.7 g. N-chlorosuccinimide was added. A small amount of dibenzoylperoxide was added and the mixture refluxed for two hours. The cooled dark brown reaction mixture was heated with charcoal, filtered and the solvent removed under reduced pressure. The residue was recrystallized from butanol to the M.P. 145–155° C. It consists mainly of ethyl N-(2-amino-5-chlorobenzenesulfonyl)pipecolinate.

EXAMPLE XIV

Ethyl N-(2-amino-4-chlorobenzenesulfonyl)pipecolinate 16.7 g. crude ethyl N-(4-chloro-2-nitrobenzenesulfonyl)pipecolinate was dissolved in 300 ml. ethanol and hydrogenated over 20 g. Raney nickel at room temperature and atmospheric pressure. The hydrogen absorption stopped after an uptake of 3200 ml. of hydrogen. The reaction mixture was filtered, the filtrate concentrated under reduce pressure and the residue recrystallized from ethanol-water. Yield: 11.2 g. (65%); M.P. 100.5–101.5° C.

*Analysis.*—For $C_{14}H_{19}ClN_2O_4S$ (M.W. 346.85)—Calc'd: C, 48.48%; H, 5.52%; N, 8.08%; Cl, 10.23%; S, 9.24%. Found: C, 48.38%; H, 5.43%; N, 7.88%; Cl, 10.07%; S, 9.25%.

EXAMPLE XV

*Ethyl N-(2-amino-5-bromobenzenesulfonyl)pipecolinate*

9.36 g. ethyl N-(2-aminobenzenesulfonyl)pipecolinate was dissolved in 300 ml. carbon tetrachloride, 5.34 g. N-bromosuccinimide was added about 60 mg. dibenzoylperoxide was added and the mixture obtained refluxed for 30 minutes. The hot reaction mixture was the diluted to a volume of about 1500 ml. with chloroform, cooled to room temperature, and washed twice with water. The organic solution was dried over sodium sulfate, and the chloroform removed under reduced pressure. The solid residue was recrystallized from ethanol M.P. 177–178° C.

*Analysis.*—For $C_{14}H_{19}BrN_2O_4S$ (M.W. 391.30)—Calc'd: C, 42.97%; H, 4.90%; N, 7.16%; Br, 20.42%; S, 8.19%. Found: C, 42.73%; H, 4.69%; N, 7.11%; Br, 20.48; S, 8.28%.

EXAMPLE XVI

*Ethyl N-(2-amino-4-trifluoromethylbenzensulfonyl) pipecolinate*

18.5 g. ethyl N-(2-nitro-4-trifluoromethylbenzenesulfonyl)pipecolinate was dissolved in 300 ml. ethanol, about 20 g. wet Raney nickel was added and the mixture hydrogenated at room temperature and atmospheric pressure. The hydrogen uptake stopped after a consumption of 3000 ml. gas. The reaction mixture was filtered, the solvent removed under reduced pressure and the residue recrystallized from ethanol. Yield: 3.2 g. (18.7%); M.P. 114–115° C.

*Analysis.*—For $C_{15}H_{19}F_3N_2O_4S$ (M.W. 380.41)—Cal'cd: C, 47.36%; H, 5.04%; N, 7.36%; S, 8.43%. Found: C, 47.51%; H, 4.99%; N, 7.41%; S, 8.67%.

EXAMPLE XVII

*Ethyl N-(2-amino-4-methylbenzenesulfonyl)pipecolinate*

14 g. ethyl N-(4-methyl-2-nitrobenzenesulfonyl)pipecolinate was dissolved in 300 ml. ethanol. 14 g. wet Raney nickel was added and the mixture hydrogenated under atmospheric pressure at room temperature. The hydrogen uptake stopped after 80 minutes (3240 ml. hydrogen). The reaction mixture was filtered and the filtrate concentrated under reduced pressure until all the alcohol was removed. The white, crystalline solid obtained was recrystallized from ethanol. Yield: 11.17 g. (92%); M.P. 121–122° C.

*Analysis.*—For $C_{15}H_{22}N_2O_4S$ (M.W. 326.41)—Calc'd: C, 55.21%; H, 6.80%; N, 8.59%; S, 9.83%. Found: C, 55.51%; H, 6.63%; N, 8.58%; S, 9.91%.

EXAMPLE XVIII

*Ethyl N-(2-amino-4-methoxybenzenesulfonyl) pipecolinate*

23 g. ethyl N-(4-methoxy-2-nitrobenzenesulfonyl)pipecolinate was dissolved in 500 ml. ethanol about 20 g. alcohol-wet Raney nickel was added and the mixture hydrogenated under atmospheric pressure and at room temperature. The uptake stopped after 4260 ml. hydrogen was consumed. The catalyst was filtered off and the filtrate evaporated to dryness under reduced pressure. The white solid was recrystallized from ethanol. Yield: 20.05 g. (94.5%); M.P. 108–109° C.

*Analysis.*—For $C_{15}H_{22}N_2O_5S$ (M.W. 342.41)—Calc'd: C, 52.63%; H, 6.48%; N, 8.18%; S, 9.37%. Found: C, 52.69%; H, 6.27%; N, 8.12%; S, 9.39%.

EXAMPLE XIX

*Ethyl N-(2-amino-4,5-dimethoxybenzenesulfonyl) pipecolinate*

6 g. ethyl N-(4,5-dimethoxy-2-nitrobenzenesulfonyl)pipecolinate was dissolved in 250 ml. ethanol, 6 g. Raney nickel (alcohol-wet) was added and the mixture hydrogenated at atmospheric pressure and room temperature. The hydrogen uptake stopped after 1½ hours; 1180 ml. hydrogen was consumed. The reaction mixture was filtered and the filtrate taken to dryness under reduced pressure. The oil obtained was crystallized and recrystallized from ethanol. Yield: 4.8 g. (87.3%); M.P. 109–110° C.

*Analysis.*—For $C_{16}H_{24}N_2O_6S$ (M.W. 372.43)—Calc'd: C, 51.61%; H, 6.49%; N, 7.52%; S, 8.61%. Found: C, 51.72%; H, 6.41%; N, 7.74%; S, 8.60%.

EXAMPLE XX

*Ethyl N-(2-amino-4,5-methylenedioxybenzenesulfonyl) pipecolinate*

50 g. wet Raney nickel was added to a suspension of 47.0 g. ethyl N-(4,5-methylenedioxy-2-nitrobenzenesulfonyl)pipecolinate in 2000 ml. ethanol. This reaction mixture was hydrogenated at atmospheric pressure and room temperature until the hydrogen uptake stopped (2600 ml. hydrogen was consumed). The mixture was filtered and the catalyst extracted with two 500 ml. portions of boiling isopropanol. The combined organic solutions were taken to dryness under reduced pressure and the solid obtained recrystallized from ethanol. Yield: 32.7 g. (75.5%); M.P. 143–144° C.

*Analysis.*—For $C_{15}H_{20}N_2O_6S$ (M.W. 356.40)—Calc'd: C, 50.54%; H, 5.66%; S, 9.00%. Found: C, 50.72%; H, 5.76%; S, 9.08%.

EXAMPLE XXI

*Isopropyl N-(2-amino-4-chlorobenzenesulfonyl) pipecolinate*

19.8 g. of isopropyl N-(4-chloro-2-nitrobenzenesulfonyl)pipecolinate was dissolved in 300 ml. ethanol and 20 g. wet Raney nickel was added. The mixture was hydrogenated at room temperature and atmospheric pressure. After 1½ hours, the hydrogen uptake stopped after 3650 ml. hydrogen was consumed. The catalyst was filtered off and the solvent removed from the filtrate under reduced pressure. The white solid residue was recrystallized from ethanol. Yield: 14.5 g. (92%); M.P. 128–129° C.

*Analysis.*—For $C_{15}H_{21}ClN_2O_4S$ (M.W. 360.86)—Calc'd: C, 49.93%; H, 5.86%; N, 7.78%. S, 8.88%. Found: C, 51.29%; H, 6.05%; N, 7.94%; S, 8.80%.

6,6,12 - TRIOXO - 1,2,3,11,12,12a - HEXAHYDRO - 4H-PYRIDO-[1,2-b]-[1,2,5]-BENZOTHIADIAZEPINE

EXAMPLE XXII (a) *N-(2-aminobenzenesulfonyl)-pipecolinic acid*

8 g. N-(2-aminobenzenesulfonyl)-pipecolinate was refluxed in 100 ml. 2 N sodium hydroxide solution until a clear solution resulted (about 1 hour). Then the mixture was cooled to 0° C., and made acidic with 2 N hydrochloric acid and extracted thoroughly with chloroform. The organic layer was dried over $Na_2SO_4$ and taken to dryness. The residual oil crystallized upon seeding and was recrystallized from a 1:1 mixture of chloroform and carbon tetrachloride. Yield: 7 g. (96%); M.P. 74–75° C.

(b) *End product*

10 g. of N-(2-aminobenzenesulfonyl)pipecolinic acid was dissolved in 150 ml. chloroform and 10 ml. thionyl chloride was added. The mixture obtained was refluxed until the first formed precipitate was dissolved again (about ¾ hour). The reaction mixture was then taken to dryness and the solid residue recrystallized twice from ethanol with charcoal treatment. Yield: 5.8 g. (63%); M.P. 213–214° C.

*Analysis.*—For $C_{12}H_{14}N_2O_3S$ (M.W. 266.25)—Calc'd: C, 54.13; H, 5.30; N, 10.52; S, 12.02%. Found: C, 53.97; H, 5.09; N, 10.75; S, 11.97%.

(c) *Alternate procedure to obtain: 6,6,12-trioxo-1,2,3,11, 12,12a-hexahydro - 4H - pyrido-[1,2-b]-[1,2,5]-benzothiadiazepine*

3.12 g. of ethyl N-(o-aminobenzenesulfonyl)pipecolinate was dissolved in 200 ml. of anhydrous toluene and 7.2 ml. of a 15% butyl lithium solution was added with stirring at room temperature and under nitrogen protection. The obtained mixture was refluxed for 20 hours. The reaction mixture was allowed to reach room temperature and was then washed with 2 N hydrochloric acid and water. The organic layer was dried over sodium sulfate, filtered and the filtrate concentrated under reduced pressure. The residual solid was recrystallized from ethanol. Yield: 0.5 g. (19.2%); M.P. 215–216° C.

*Analysis.*—For $C_{12}H_{14}N_2SO_3$ (M.W. 266.25)—Calc'd: C, 54.13; H, 5.30; N, 10.52; S, 12.02%. Found: C, 53.97; H, 5.09; N, 10.75; S, 11.97%.

Example XXIII

*7-chloro-6,6-12-trioxo-1,2,3,11,12,12a-hexahydro-4H-pyrido-[1,2-b]-[1,2,5]-benzothiadiazepine*

30.6 g. ethyl N-(6-amino-2-chlorobenzenesulfonyl)-pipecolinate was refluxed with 350 ml. 2 N sodium hydroxide solution for 3 hours. The solution obtained was made acidic with 2 N hydrochloric acid at 0° C. The gummy precipitate which formed, crystallized when some chloroform was added. The free acid was filtered off and dried (15.75 g.). The dry acid was refluxed with a mixture of 250 ml. chloroform and 16 ml. thionyl chloride for about 2 hours. The reaction mixture was then cooled and the solvent removed under reduced pressure. A yellowish solid was obtained and recrystallized from butanol with charcoal treatment. Yield: 9.3 g. (35.1%); M.P. 254–255° C.

*Analysis.*—For $C_{12}H_{13}ClN_2O_3S$ (M.W. 300.76)—Calc'd: C, 47.91; H, 4.36; N, 9.32; Cl, 11.79; S, 10.66%. Found: C, 47.75; H, 4.38; N, 9.58; Cl, 11.60; S, 10.66%.

Example XXIV

*8-chloro-6,6,12-trioxo-1,2,3,11,12a-hexahydro-4H-pyrido-[1,2-b]-[1,2,5]-benzothiadiazepine*

25.4 g. ethyl N-(2-amino-5-chlorobenzenesulfonyl)-pipecolinate was refluxed with 150 ml. 2 N sodium hydroxide solution for 3 hours, cooled to 0° C. and acidified with 2 N hydrochloric acid. The precipitated acid was extracted with a large amount of chloroform, dried over sodium sulfate, filtered and the solvent evaporated under reduced pressure. From the remaining brown oil could be obtained 11.3 g. of solid acid upon treatment with chloroform. This free acid was added to 100 ml. thionyl chloride and the mixture was refluxed for 45 minutes and then the excess thionyl chloride was removed under reduced pressure. The remaining solid was recrystallized from butanol. Yield: 3.6 g. (16.3%); M.P. 241–242° C.

*Analysis.*—For $C_{12}H_{13}ClN_2O_3S$ (M.W. 300.78)—Calc'd: C, 47.91; H, 4.37; N, 9.32; S, 10.66; Cl, 11.79%. Found: C, 48.25; H, 4.37; N, 9.36; S, 10.50; Cl, 11.68%.

Example XXV

*Alternative pathway to 8-chloro-6,6,12-trioxo-1,2,3,11, 12,12a-hexahydro - 4H - pyrido-[1,2-b]-[1,2,5]benzothiadiazepine*

10.4 g. 6,6,12 - trioxo - 1,2,3,11,12,12a-hexahydro-4H-pyrido-[1,2-b]-[1,2,5]benzothiadiazepine was dissolved in the smallest amount of hot glacial acetic acid possible. The solution obtained was rapidly cooled to room temperature. 260 ml. of a chlorine solution in glacial acetic acid (about 7 g. chlorine/100 g. glacial acetic acid) was then added. The mixture obtained was allowed to remain at room temperature for 15 hours and was then poured into a large amount of ice-water. The white precipitate was filtered off, washed with water, dried, and recrystallized from butanol with charcoal treatment. Yield: 2.4 g. (20.5%); M.P. 225° C.

Example XXVI

*9-chloro-6,6,12-trioxo-1,2,3,11,12,12a-hexahydro-4H-pyrido-[1,2-b]-[1,2,5]benzothiadiazepine*

10 g. ethyl N-(4-chloro-2-nitrobenzenesulfonyl)pipecolinate was dissolved in 300 ml. ethanol and hydrogenated over Raney nickel at atmospheric pressure until the hydrogen-uptake stopped. The reaction mixture was filtered, the filtrate taken to dryness and the residual oil refluxed with 100 ml. 2 N NaOH until a clear solution was obtained (about 3 hours). The mixture was cooled to 0° C. and acidified with 2 N HCl. The separated acid was extracted with chloroform, the organic layer dried over MgSO₄ and refluxed for 30 minutes with 10 ml. thionyl chloride. The reaction mixture was then washed with water, dried with Na₂SO₄ and taken to dryness under reduced pressure. The brown solid residue was recrystallized from ethanol with charcoal treatment and given a white crystalline solid. Yield: 2.5 g. (31.5%).

*Analysis.*—For $C_{12}H_{13}ClN_2O_2S$ (M.W. 300.78)—Calc'd: C, 47.91; H, 4.37; N, 9.32; Cl, 11.79%. Found: C, 47.91; H, 4.38; N, 9.57; Cl, 11.80%.

Example XXVII

*8-bromo-6,6,12-trioxo-1,2,3,11,12,12a-hexahydro-4H-pyrido-[1,2-b]-[1,2,5]benzothiadiazepine*

Ethyl N-(2-amino-5-bromobenzenesulfonyl)pipecolinate was refluxed with 100 ml. 2 N sodium hydroxide solution for two hours. The clear solution obtained was acidified at 0° C. with 6 N hydrochloric acid and the precipitated acid extracted with chloroform. The combined chloroform extracts (total volume not more than 100 ml.) were dried over sodium sulfate, filtered, and refluxed for 30 minutes with 10 ml. thionyl chloride. The solvent was then removed under reduced pressure and the solid residue recrystallized from butanol with charcoal treatment. Yield: 4.5 g. (44.5%); M.P. 240–241° C.

*Analysis.*—For $C_{12}H_{13}BrN_2O_3S$ (M.W. 345.23)—Cal'd: C, 41.75; H, 3.80; N, 8.12; Br, 23.15; S, 9.29%. Found: C, 41.66; H, 4.03; N, 8.04; Br, 23.12; S, 9.31%.

Example XXVIII

*9 - trifluoromethyl - 6,6,12 - trioxo - 1,2,3,11,12,12a - hexahydro-4H-pyrido-[1,2-b]-[1,2,5]benzothiadiazepine*

10 g. of ethyl N-(4-trifluoromethyl-2-nitrobenzene-sulfonyl)pipecolinate was dissolved in 300 ml. ethanol and hydrogenated at nearly atmospheric pressure over Raney nickel until no more hydrogen was taken up. The reaction mixture was filtered and taken to dryness under reduced pressure and the residue refluxed with 100 ml. 2 NaOH for one hour. The solution obtained was made acidic with 2 N HCl and the precipitate extracted with chloroform. The organic solution was dried over MgSO₄ and then refluxed for 30 minutes with 2 ml. thionyl chloride. The solution obtained was subsequently washed with water, dried over Na₂SO₄ and taken to dryness. The residue crystallized from petroleum ether and was recrystallized from 50% ethanol. Yield: 4.09 g. (50.5%); M.P. of 192–193° C.

*Analysis.*—For $C_{13}H_{13}F_3N_2O_3S$ (M.W. 334.33)—Calc'd: C, 46.70; H, 3.93; N, 8.38; S, 9.59%. Found: C, 46.84; H, 3.79; N, 8.58; S, 9.72%.

If instead of 2 ml. thionyl chloride, 4 g. phosphorus trichloride was added to the chloroform solution of the free acid, the obtained mixture refluxed for 2 hours, the solvent removed under reduced pressure and the solid residue recrystallized from diluted ethanol, 3.8 g. (43.5%) of the desired end-product was obtained. M.P. 193–194° C.

Example XXIX

9-methyl-6,6,12-trioxo-1,2,3,11,12,12a-hexahydro-4H-pyrido-[1,2-b]-[1,2,5]benzothiadiazepine

11.75 g. ethyl N-(2-amino-4-methylbenzenesulfonyl) pipecolinate was refluxed in 120 ml. 2 N sodium hydroxide solution for 3 hours. The cooled clear reaction mixture was acidified with 2 N hydrochloric acid at 0° C. The mixture obtained was extracted with chloroform and the combined organic layers dried over sodium sulfate. After filtration (total volume not larger than 1000 ml.) 15 ml. thionyl chloride was added to the chloroform solution of the acid obtained and the mixture refluxed for 30 minutes. The cooled reaction mixture was washed with water, dried over sodium sulfate, and the solvent removed in vacuo after filtration. The obtained solid product was recrystallized from enthanol. Yield: 5.2 g. (51.5%); M.P. 241.5–242.5° C.

*Analysis.*—For $C_{13}H_{16}N_2O_3S$ (M.W. 280.34)—Calc'd: C, 55.69; H, 5.75; N, 9.99; S, 11.44%. Found: C, 55.67; H, 5.83; N, 9.90; S, 11.40%

The pipecolinic acid can be obtained in a solid stage if the filtered chloroform solution is taken to dryness under reduced pressure The residual oil crystallizes. Yield: 15 g. (~100%); M.P. 127–129 C.

Example XXX

9-methoxy-6,6,12-trioxo-1,2,3,11,12,12a-hexahydro-4H-pyrido-[1,2-b]-[1,2,5]benzothiadiazepine

17 g. ethyl N-(2-amino-4-methoxybenzenesulfonyl)-pipecolinate was refluxed with 140 ml. 2 N sodium hydroxide solution for 2 hours. During this time, a clear solution was obtained. The reaction mixture was then acidified with 2 N hydrochloric acid at 0° C. and the precipitated acid extracted with chloroform. The combined organic extracts (about 1000 ml. total volume) were dried over sodium sulfate, filtered and refluxed with 10 ml. thionyl chloride for 20 minutes, cooled to room temperature, washed with water, dried over sodium sulfate, filtered, and the solvent removed under reduced pressure. The yellowish solid obtained was recrystallized from ethanol. Yield: 4 g. (27.2%); M.P. 250–251° C.

*Analysis.*—For $C_{13}H_{16}N_2O_4S$ (M.W. 296.34)—Calc'd: C, 52.68; H, 5.44; N, 9.46; S, 10.82%. Found: C, 52.87; H, 5.21; N, 9.49; S, 10.86%.

Example XXXI

8,9-dimethoxy-6,6,12-trioxo-1,2,3,11,12,12a-hexahydro-4H-pyrido-[1,2-b]-[1,2,5]-benzothiadiazepine

4.1 g. ethyl N-(2-amino-4,5-dimethoxybenzenesulfonyl)pipecolinate was refluxed with 40 ml. 2 N sodium hydroxide solution for 3 hours. The cooled reaction mixture was acidified at 0° C. wth 2 N hydrochloric acid and the precipitated acid extracted with chloroform. The combined organic layers were dried over sodium sulfate, filtered (total volume about 300 ml.), and refluxed for 30 minutes with 4.7 ml. thionyl chloride. The cooled reaction mixture was then washed with water, dried over sodium sulfate, filtered, and the solvent removed under reduced pressure. The glassy compound obtained was crystallized and recrystallized from ethanol. Yield 1.4 g. (39.0%); M.P. 213–214° C.

*Analysis.*—For $C_{14}H_{18}N_2O_5S$ (M.W. 326.37)—Calc'd. C, 51.50; H, 5.56; N, 8.59; S, 9.83%. Found: C, 51.35; H, 5.35; N, 8.61; S, 9.83%.

Example XXXII

8,9-dimethoxy-6,6,12-trioxo-1,2,3,11,12,12a-hexahydro-4H-pyrido-[1,2-b]-[1,2,5]-benzothiadiazepine

(a) *N-(2-amino-4,5-methylenedioxybenzenesulfonyl)pipecolinic acid.*—32.6 g. ethyl N-(2-amino-4,5-methylenedioxybenzenesulfonyl)pipecolinate was refluxed for 3 hours with 200 ml. 2 N sodium hydroxide solution. The cooled, clear reaction mixture was acidified with 2 N hydrochloric acid at 0° C. and extracted with a large amount of chloroform. A portion of acid precipitated out of the chloroform solution and was filtered off. The filtrate was evaporated to dryness under reduced pressure and the solid residue obtained combined with the above filtered off portion and dried at 45° C. for 15 hours. Yield 26.7 g. (88.5%); M.P. 168–171° C.

(b) *Desired compound.*—26.7 g. N-(2-amino-4,5-methylenedioxybenzenesulfonyl)pipecolinic acid was suspended in 500 ml. chloroform and 17.1 g. phosphorous pentachloride was added. The mixture was refluxed for 45 minutes and then allowed to cool to room temperature. The brown solid was filtered off (9.5 g.) and the filtrate evaporated to dryness yielding 13.4 g. of a partially solid material which was recrystallized from butanol. The obtained solid was combined with the 9.5 g. residue from the filtration mentioned above and recrystallized from dimethylsulfoxide-ethanol or butanol. Yield 22.9 g. (91%); M.P. 291–292° C.

*Analysis.*—For: $C_{13}H_{14}N_2O_5S$ (M.W. 310.33)—Calc'd: C, 50.31; H, 4.55; N, 9.03; S, 10.33%. Found: C, 50.47; H, 4.69; N, 9.30; S, 10.22%.

Example XXXIII

8,10-dichloro-9-methoxy-6,6,12-trioxo-1,2,3,11,12,12a-hexahydro-4H-pyrido-[1,2-b]-[1,2,5]benzothiadiazepine

5 g. 9-methoxy-6,6,12-trioxo-1,2,3,11,12,12a-hexahydro-4H-pyrido-[1,2-b]-[1,2,5]benzothiadiazepine was dissolved in 100 ml. glacial acetic acid (hot), a small portion of iodine was added and dissolved. 100 ml. of a saturated chlorine solution in glacial acetic acid was then added slowly with shaking. The reaction mixture obtained was heated on a steam bath for 45 minutes. After the reaction mixture had been allowed to stand overnight, the acetic acid was distilled off under reduced pressure and the solid residue recrystallized three times from butanol-dimethylformamide. Yield: 3.14 g. (51%); M.P. 234–235° C.

*Analysis.*—For: $C_{13}H_{14}Cl_2N_2O_4S$ (M.W. 365.24)—Calc'd: C, 42.76; H, 3.87; N, 7.67; Cl, 19.42; S, 8.78%. Found: C, 43.04; H, 4.02; N, 7.73; Cl, 19.63; S 8.58%.

Example XXIV

8-nitro-6,6,12-trioxo-1,2,3,11,12,12a-hexahydro-4H-pyrido-[1,2-b]-[1,2,5]benzothiadiazepine

20 g. 6,6,12-trioxo-1,2,3,11,12,12a-hexahydro-4H-pyrido-[1,2-b]-[1,2,5]benzothiadiazepine was introduced step wise into 100 ml. fuming nitric acid (90%) at 0° C. with stirring. The solution obtained was stirred for two hours after the addition was completed and then poured over ice. The precipitated solid was filtered off, washed neutral with water, and dried. It was recrystallized from butanol with charcoal treatment 3 times. Yield: 21.5 g. (91.5%); M.P. 234–235° C. (dec.).

*Analysis.*—For: $C_{12}H_{13}N_3O_5S$ (M.W. 311.31)—Calc'd: C, 46.29; H, 4.21; N, 13.54; S, 10.30%. Found: C, 46.18; H, 4.40; N, 13.52; S, 10.40%.

Example XXXV

8-amino-6,6,12-trioxo-1,2,3,11,12,12a-hexahydro-4-pyrido-[1,2-b]-[1,2,5]-benzothiadiazepine

6.22 g. of 8-nitro-6,6,12-trioxo-1,2,3,11,12,12a-hexahydro-4H-pyrido-[1,2-b]-[1,2,5]-benzothiadiazepine was partially dissolved in 250 ml. isopropanol and 1 g. Pd (5%) on charcoal catalyst was added. This mixture was hydrogenated under atmospheric pressure and at room temperature until the hydrogen uptake stopped. Uptake: 1450 ml. (calc. 1540 ml.)

The reaction mixture was heated up to the boiling point and filtered hot. The residue was extracted with a hot mixture of butanol and dimethylformamide. The combined organic filtrates were evaporated nearly to dryness and the residue suspended in ethanol and filtered. Yield of crude material: 4.5 g. (83%), The crude material was crystalized twice from dimethylformamide-water. A yellow powder was obtained. Yield: 2.03 g. (36.5%); M.P. 275° C. (dec.)

Analysis.—For $C_{12}H_{15}N_3O_3S$ (M.W. 281.33)—Calc'd: C, 51.24; H, 5.37; N, 14.94%. Found: C, 51.40; H, 5.47; N, 15.08%.

6,6 - DIOXO - 1,2,3,11,12,12a - HEXAHYDRO - 4H-PYRIDO-[1,2-b]-[1,2,5]BENZOTHIADIAZEPINES

EXAMPLE XXXVI 6,6-dioxo-1,2,3,11,12,12a-hexahydro-4H-pyrido-[1,2-b]-[1,2,5]benzothiadiazepine To a solution of 0.72 g. of $LiAlH_4$ in 150 ml. anhydrous tetrahydrofuran was slowly added 5 g. solid 6,6,12-trioxo-1,2,3,11,12,12a - hexahydro - 4H - pyrido-[1,2-b]-[1,2,5]-benzothiadiazepine at room temperature. The reaction mixture was then heated to 40° C. for three hours and afterwards recovery was made at 0° C. by subsequent addition of 1 ml. water, 1 ml. 5 N NaOH, 3 ml. water, and filtered after stirring for 30 minutes at 0° C. The residue was washed thoroughly with tetrahydrofuran and the combined filtrates taken to dryness. The crystalline residue was recrystallized from ethanol. Yield: 2.5 g. (53%); M.P. 130–131° C.

Analysis.—For $C_{12}H_{16}N_2O_2S$ (M.W. 252.35)—Calc'd: C, 57.12; H, 6.39; N, 11.10; S, 12.71%. Found: C, 56.99; H, 6.47; N, 11.08; S, 12.74%.

EXAMPLE XXXVII 7-chloro-6,6-dioxo-1,2,3,11,12,12a-hexahydro-4H-pyrido-[1,2-b]-[1,2,5]benzothiadiazepine Diborane generated by slowly adding a solution of 1.9 g. sodium borohydride in 40 ml. anhydrous diglyme to a stirred mixture of 19 g. borontrifluoride-etherate and 40 ml. anhydrous diglyme was carried by a stream of nitrogen into a stirred suspension of 4.2 g. 7-chloro-6,6,12-trioxo-1,2,3,11,12,12a - hexahydro - 4H - pyrido-[1,2-b]-[1,2,5]-benzothiadiazepine in 200 ml. anhydrous tetrahydrofuran at room temperature. The suspension gradually cleared up and the resulting solution was stirred for one hour at 25° C. after all the diborane had been introduced. Then it was refluxed for three hours. Recovery was made from the cooled reaction mixture by adding slowly 10 ml. water, acidifying by adding a small amount of 2 N hydrochloric acid, and pouring into 1000 ml. of ice-cold water. After a few hours at 5° C., the separated crystalline material was filtered off and dried (3.3 g.). It was recrystallized from ethanol. Yield: 1.5 g. (37.4%); M.P. 201–202° C.

Analysis.—For $C_{12}H_{15}ClN_2O_2S$ (M.W. 286.79)—Calc'd: C, 50.24; H, 5.27; N, 9.77; S, 11.18%. Found: C, 50.12; H, 5.35; N, 9.82; S, 11.21%.

EXAMPLE XXXVIII 8-chloro-6,6-dioxo-1,2,3,11,12,12a-hexahydro-4H-pyrido-[1,2-b]-[1,2,5]-benzothiadiazepine Diborane generated by adding a solution of 2.9 g. sodium borohydride in 40 ml. anhydrous diglyme to a stirred mixture of 29 g. bonontrifluoride etherate and 40 ml. anhydrous diglyme was carried by a stream of nitrogen into a stirred suspension of 3.6 g. of 8-chloro-6,6,12-trioxo-1,2,3,11,12,12a - hexahydro - 4H - pyrido-[1,2-b]-[1,2,5]-benzothiadiazepine in 200 ml. anhydrous tetrahydrofuran. The suspension gradually cleared up and the resulting solution was stirred for one hour at 25° C., then refluxed for three hours. Recovery was made from the cooled reaction mixture by slowly adding 10 ml. water, then acidifying with a small amount of 2 N hydrochloric acid, and pouring into 1000 ml. ice-cold water. After a few hours at 5° C. the separated solid was filtered off and recrystallized from ethanol. M.P. 173–174° C.

Analysis. — For $C_{12}H_{15}ClN_2O_2S$ (M.W. 286.79)—Calc'd: C, 50.25; H, 5.27; N, 9.77; S, 11.18%. Found: C, 50.04; H, 5.32; N, 9.62; S, 11.25%.

EXAMPLE XXXIX 9-chloro-6,6-dioxo-1,2,3,11,12,12a-hexahydro-4H-pyrido-[1,2-b]-[1,2,5]-benzothiadiazepine (a) 12 g. 9-chloro-6,6,12-trioxo-1,2,3,11,12,12a-hexahydro-4H-pyrido-[1,2-b]-[1,2,5]-benzothiadiazepine and 6 g. sodium borohydride were suspended in 200 ml. anhydrous diglyme and the mixture obtained stirred for 15 minutes. Then 7.2 g. of anhydrous aluminum chloride was introduced very slowly under $N_2$-cover. The resulting reaction mixture was stirred at room temperature over night and then slowly poured into a stirred mixture of 200 ml. 6 N hydrochloric acid and about 200 ml. ice. Stirring was continued for about two hours. The white precipitate which formed was filtered off, washed with water and dried under reduced pressure. The crystalline solid was recrystallized twice from ethanol-dimethyl-sulfoxide with charcoal treatment. Yield 5 g. (43.5%); M.P. 207–208° C.

Analysis.—For $C_{12}H_{15}ClN_2O_2S$ (M.W. 286.79)—Calc'd: C, 50.24%; H, 5.27%; N, 9.77%; S, 11.18%. Found: C, 50.29%; H, 5.28%; N, 9.91%; S, 11.37%.

(b) Alternative pathway for 9-chloro-6,6-dioxo-1,2,3,11,12,12a - hexahydro - 4H-pyrido-[1,2-b]-[1,2,5]-benzothiadiazepine (1) 9-chloro-6,6-dioxo-12-thio - 1,2,3,11,12,12a - hexahydro-4H-pyrido-[1,2-b]-[1,2,5] - benzothiadiazepine.— A mixture of 3.01 g. 9-chloro-6,6,12-trioxo-1,2,3,11,12, 12a-hexahydro-4H-pyrido - [1,2 - b] - [1,2,5] - benzothiadiazepine, 2.44 g. phosphorus pentasulfide and 20 ml. pyridine was refluxed with stirring for 45 minutes under anhydrous conditions. The obtained reaction mixture was poured slowly with stirring into 50 ml. ice-cold saturated sodium chloride solution. The obtained mixture was diluted with water to about 300 ml. and the precipitated brown solid filtered off, washed with water and dried under reduced pressure. The dry, dark-red powder was extracted with 250 ml. boiling methylenechloride and this extract was filtered through a small amount of alumina (basic, act I) with a total volume of about 2000 ml. methylene chloride. The methylene chloride was removed from the filtrate and the yellow residue recrystallized from butanol to the M.P. 200–201° C. (dec.). Yield: 500 mg. (15.8%).

Analysis.—For $C_{12}H_{13}ClN_2O_2S_2$ (M.W. 316.83)—Calc'd: C, 45.49; H, 4.13; N, 8.85; S, 20.24; Cl, 11.20%. Found; C, 45.54; H, 4.25; N, 9.14; S, 20.17; Cl, 11.40%.

(2) 9-chloro-6,6 - dioxo - 1,2,3,11,12,12a - hexahydro-4H-pyrido-[1,2-b]-[1,2,5]-benzothiadiazepine.—250 mg. 9-chloro-6,6-dioxo-12-thio- 1,2,3,11,12,12a - hexahydro-4H-pyrido-[1,2-b] - [1,2,5] - benzothiadiazepine was dissolved in 50 ml. ethanol. About 2 g. wet Raney nickel was added and the mixture obtained refluxed for 12 hours. The catalyst was then filtered off, the solvent removed under reduced pressure, and the remaining oil crystallized from a small amount of ethanol. The solid obtained was recrystallized from butanol. Yield: 100 mg. (44%); M.P. 207–208° C.

EXAMPLE XL 8-bromo-6,6-dioxo-1,2,3,11,12,12a-hexahydro-4H-pyrido-[1,2-b]-[1,2,5]-benzothiadiazepine Diborane generated by slowly adding a solution of 3.8 g. sodium borohydride in 80 ml. anhydrous diglyme to a mixture of 38 g. borontrifluoride-etherate and 80 ml. anhydrous diglyme was carried by a stream of nitrogen into a stirred suspension of 10 g. 8-bromo-6,6,12-trioxo-1,2,3, 11,12,12a-hexahydro-4H-pyrido-[1,2-b] - [1,2,5] - benzothiadiazepine in 200 ml. anhydrous tetrahydrofuran at room temperature. The suspension gradually cleared up and the resulting solution was stirred at 25° C. for one hour, and then refluxed for three hours. Recovery was made from the cooled reaction mixture by adding 30 ml. 2 N hydrochloric acid and pouring into 1000 ml. ice-cold water. After a few hours at 5° C., the separated crystalline material was filtered off and dried (9.2 g.). It was recrystallized from dimethylsulfoxide ethanol. Yield: 3.8 g. (40%); M.P. 187-188° C.

Analysis.—For $C_{12}H_{15}BrN_2O_2S$ (M.W. 331.24).—Calc'd: C, 43.51; H, 4.57; N, 8.46; S, 9.68; Br, 24.13%. Found: C, 43.64; H, 4.54; N, 8.65; S, 9.78; Br, 24.12%.

EXAMPLE XLI

*9-trifluoromethyl-6,6-dioxo-1,2,3,11,12,12a-hexahydro-4H-pyrido-[1,2-b]-[1,2,5]-benzothiadiazepine*

Diborane generated by slowly adding a solution of 1.9 g. sodium borohydride in 40 ml. diglyme to a stirred mixture of 19 g. borantrifluoride-etherate and 40 ml. anhydrous diglyme was carried by a stream of nitrogen into a stirred suspension of 5.5 g. 9-trifluoromethyl-6,6,12-trioxo-1,2,3,11,12,12a-hexahydro-4H - pyrido - [1,2-b]-[1,2,5]-benzothiadiazepine in 200 ml. anhydrous tetrahydrofuran at room temperature. The suspension gradually cleared up and the resulting solution was stirred at 25° C. for one hour, and then refluxed for three hours. Recovery was made from the cooled reaction mixture by slowly adding 10 ml. water, acidifying by the addition of a small amount of 2 N hydrochloric acid and pouring into 1000 ml. of ice-cold water. After a few hours at 5° C., the separated crystalline material was filtered off and dried (5 g.). It was recrystallized from ethanol. Yield: 2.3 g. (43.7%); M.P. 141-142° C.

Analysis.—For $C_{13}H_{15}F_3N_2O_2S$ (M.W. 320.34)—Calc'd: C, 48.73; H, 4.72; N, 8.75; S, 10.01%. Found: C, 48.91; H, 4.87; N, 9.00; S, 10.31%.

EXAMPLE XLII

*9-methyl-6,6-dioxo-1,2,3,11,12,12a-hexahydro-4H-pyrido-[1,2-b]-[1,2,5]-benzothiadiazepine*

(a) 14 g. 9-methyl-6,6,12-trioxo-1,2,3,11,12,12a-hexahydro-4H-pyrido-[1,2-b]-[1,2,5]-benzothiadiazepine and 7.5 g. sodium borohydride were suspended in 250 ml. anhydrous diglyme and the mixture obtained stirred for 15 minutes. 9 g. anhydrous aluminum chloride was added slowly under nitrogen cover and the reaction mixture obtained at room temperature over night. It was then slowly poured into an excess ice-cold 6 N hydrochloric acid. The white precipitate that formed was filtered off after two hours stirring of the reaction mixture, and dried and recrystallized from ethanol-dimethylsulfoxide. Yield: 8.3 g. (65.5%); M.P. 197-198° C.

Analysis.—For $C_{12}H_{18}N_2O_2S$ (M.W. 266.36)—Calc'd: C, 58.61; H, 6.81; N, 10.51; S, 12.03%. Found: C, 58.52; H, 6.84; N, 10.68; S, 11.93%.

(b) *Alternative pathway for 9-methyl-6,6-dioxo-1,2,3,11,12,12a-hexahydro-4H-pyrido-[1,2-b] - [1,2,5] - benzothiadiazepine.*—Diborane generated by adding a solution of 9 g. sodium borohydride in 180 ml. anhydrous diglyme slowly to a mixture of 90 g. borontrifluoride-etherate and 180 ml. anhydrous diglyme was carried by a stream of nitrogen into a stirred suspension of 18.1 g. N-(2-amino-4-methylbenzenesulfonyl)pipecolinic acid in 250 ml. anhydrous tetrahydrofuran. The mixture gradually cleared up, hydrogen was evolved, and the clear solution obtained was stirred for 1½ hours at 25° C. Recovery was made by slowly adding 20 ml. water, acidifying with 20 ml. 2 N hydrochloric acid, and pouring into 1000 ml. ice-cold water. The mixture obtained was made alkaline with 30% potassium carbonate solution and extracted with ethyl acetate. The organic extract was dried over sodium sulfate, filtered, and the solvent removed under reduced pressure. The residual gum (15.8 g.) was dissolved in hot ethanol, treated with charcoal and filtered. Upon cooling, the desired compound crystallized out and was filtered off and recrystallized. Yield: 2.1 g. (13%); M.P. 196-197° C.

EXAMPLE XLIII

*9-methoxy-6,6-dioxo-1,2,3,11,12,12a-hexahydro-4H-pyrido-[1,2-b]-[1,2,5]-benzothiadiazepine*

Diborane generated by slowly adding a solution of 3.8 g. sodium borohydride in 80 ml. anhydrous diglyme to a stirred mixture of 38 g. borontrifluoride-etherate and 80 ml. anhydrous diglyme was carried by a stream of nitrogen into a stirred suspension of 8.88 g. 9-methoxy-6,6,12 - trioxo - 1,2,3,11,12,12a - hexahydro - 4H-pyrido-[1,2-b]-[1,2,5]-benzothiadiazepine in 200 ml. anhydrous tetrahydrofuran at room temperature. The suspension gradually cleared up and the resulting solution was stirred for one hour at 25° C., then for three hours at refluxing temperature. Recovery was made from the cooled reaction mixture by slowly adding 20 ml. water, then acidifying by adding a small amount of 2 N hydrochloric acid and pouring into 1000 ml. ice-cold water. After a few hours at 5° C., the separated crystalline material was filtered off, dried, and recrystallized from ethanol. Yield: 5.7 g. (68%); M.P. 152-153° C.

Analysis.—For $C_{13}H_{18}N_2O_3S$ (M.W. 282.36)—Calc'd: C, 55.29; H, 6.42; N, 9.92; S, 11.35%. Found: C, 55.35; H, 6.40; N, 10.28; S, 11.43%.

EXAMPLE XLIV

*8,9-dimethoxy-6,6-dioxy-1,2,3,11,12,12a-hexahydro-4H-pyrido-[1,2-b]-[1,2,5]-benzothiadiazepine*

Diborane generated by slowly adding a solution of 3.8 g. sodium borohydride in 80 ml. anhydrous diglyme to a stirred mixture of 38 g. borotrifluoride-etherate and 80 ml. anhydrous diglyme was carried by a stream of nitrogen into a stirred suspension of 9.8 g. 8,9-dimethoxy-6,6,12 - trioxo - 1,2,3,11,12,12a - hexahydro - 4H-pyrido-[1,2-b]-[1,2,5]-benzothiadiazepine in 200 ml. anhydrous tetrahydrofuran at room temperature. The suspension gradually cleared up and the resulting solution was stirred for one hour at 25° C. and three hours at refluxing temperature. Recovery was made from the cooled reaction mixture by slowly adding 20 ml. water, then acidifying by adding a small amount of 2 N hydrochloric acid, and pouring into 1000 ml. ice-cold water. After a few hours at 5° C. the separated crystalline material was filtered off, dried, and recrystallized from butanol. Yield: 5.2 g. (55.5%); M.P. 174-175° C.

Analysis.—For $C_{14}H_{20}N_2O_4S$ (M.W. 312.39)—Calc'd: C, 53.82; H, 6.45; N, 8.97; S, 10.26%. Found: C, 54.04; H, 6.49; N, 9.95; S, 10.22%.

EXAMPLE XLV

*8,9-methylenedioxy-6,6-dioxo-1,2,3,11,12,12a-hexahydro-4H-pyrido-[1,2-b]-[1,2,5]-benzothiadiazepine*

Diborane generated by slowly adding a solution of 2 g. sodium borohydride in 50 ml. anhydrous diglyme to a stirred mixture of 20 g. borontrifluoride-etherate and 50 ml. anhydrous diglyme was carried by a stream of nitrogen into a stirred suspension of 5.7 g. 8,9-methylenedioxy-6,6,12 - trioxo - 1,2,3,11,12,12a - hexahydro - 4H-pyrido-[1,2-b]-[1,2,5]-benzothiadiazepine in 200 ml. anhydrous tetrahydrofuran at room temperature. The suspension gradually cleared up and the resulting solution was stirred for one hour at 25° C., and then refluxed for three hours. Recovery was made from the cooled reaction mixture by slowly adding 10 ml. water, then acidifying by the addition of a small amount of 2 N hydrochloric acid, and pouring into 1000 ml. ice-cold water. After a few hours at 5° C., the separated crystalline material was filtered off, dried, and recrystallized from a dimethylenesulfoxide-ethanol-water mixture. Yield: 3.5 g. (64.2%); M.P. 212-213° C.

Analysis.—For $C_{13}H_{16}H_2O_4S$ (M.W. 296.35)—Calc'd: C, 52.68; H, 5.44; N, 9.45; C, 10.82%. Found: C, 52.75; H, 5.46; N, 9.71; C, 10.83%.

Example XLVI

The corresponding nitro and amino 6,6-dioxo-1,2,3,11,12,12a - hexahydro - 4H - pyrido-[1,2-b]-[1,2,5]-benzothiadiazepine compounds are obtained if the procedures of Examples XXXIV and XXXV are employed using the 6,6-dioxo-1,2,3,11,12,12a-hexahydro-4H-pyrido-[1,2-b]-[1,2,5]-benzothiadiazepine in lieu of 6,6,12-trioxo - 1,2,3,11,12,12a - hexahydro - 4H - pyrido - [1,2-b]-[1,2,5]-benzothiadiazepine as the starting material.

While the invention has been explained by detailed description of certain specific embodiments, it is understood that various modifications and substitutions can be made in any of them within the scope of the appended claims which are intended also to include equivalents of such embodiments.

What is claimed is:

1. A compound of the formula

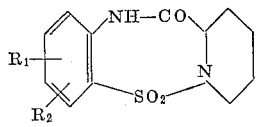

wherein $R_1$ and $R_2$ each are members selected from the group consisting of hydrogen, halogen, trifluoromethyl, nitro, amino, lower alkyl, lower alkoxy and methylenedioxy.

2. 6,6,12 - trioxo - 1,2,3,11,12,12a - hexahydro - 4H-pyrido-[1,2-b]-[1,2,5]-benzothiadiazepine.
3. 9-chloro-6,6,12-trioxo - 1,2,3,11,12,12a - hexahydro-4H-pyrido[1,2-b]-[1,2,5]-benzothiadiazepine.
4. 9 - trifluoromethyl - 6,6,12 - trioxo-1,2,3,11,12,12a-hexahydro-4H-pyrido[1,2-b]-[1,2,5] - benzothiadiazepine.
5. 9 - methyl - 6,6,12 - trioxo - 1,2,3,11,12,12a - hexahydro-4H-pyrido-[1,2-b]-[1,2,5]-benzothiadiazepine.
6. 8,9 - dimethoxy - 6,6,12-trioxo-1,2,3,11,12,12a-hexahydro-4H-pyrido-[1,2-b]-[1,2,5]-benzothiadiazepine.
7. 9 - methoxy - 6,6,12 - trioxo - 1,2,3,11,12,12a-hexahydro-4H-pyrido-[1,2-b]-[1,2,5]-benzothiadiazepine.
8. 8-bromo - 6,6,12 - trioxo - 1,2,3,11,12,12a - hexahydro-4H-pyrido-[1,2-b]-[1,2,5]-benzothiadiazepine.
9. 8 - nitro - 6,6,12 - trioxo - 1,2,3,11,12,12a - hexahydro-4H-pyrido-[1,2-b]-[1,2,5]-benzothiadiazepine.
10. 7 - chloro - 6,6,12 - trioxo - 1,2,3,11,12,12a - hexahydro-4H-pyrido-[1,2-b]-[1,2,5]-benzothiadiazepine.
11. 8,10 - dichloro - 9 - methoxy - 6,6,12 - trioxo-1,2,3,11,12,12a - hexahydro - 4H - pyrido - [1,2-b] - [1,2,5]-benzothiadiazepine.
12. 8 - amino - 6,6,12 - trioxo - 1,2,3,11,12,12a - hexahydro-4H-pyrido-[1,2-b]-[1,2,5]-benzothiadiazepine.
13. 8 - chloro - 6,6,12 - trioxo - 1,2,3,11,12,12a - hexahydro-4H-pyrido-[1,2-b]-[1,2,5]-benzothiadiazepine.
14. 8,9 - dimethoxy-6,6,12-trioxo-1,2,3,11,12,12a-hexahydro-4H-pyrido-[1,2-b]-[1,2,5]-benzothiadiazepine.
15. A compound of the formula

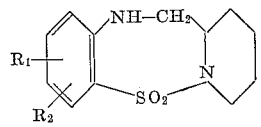

wherein $R_1$ and $R_2$ each are members selected from the group consisting of hydrogen, halogen, trifluoromethyl, lower alkyl, lower alkoxy and methylenedioxy, nitro, and amino.

16. 6,6 - dioxo - 1,2,3,11,12,12a - hexahydro - 4H-pyrido-[1,2-b]-[1,2,5]-benzothiadiazepine.
17. 9 - chloro - 6,6 - dioxo - 1,2,3,11,12,12a - hexahydro-4H-pyrido-[1,2-b]-[1,2,5]-benzothiadiazepine.
18. 9 - methyl - 6,6 - dioxo - 1,2,3,11,12,12a - hexahydro-4H-pyrido-[1,2-b]-[1,2,5]-benzothiadiazepine.
19. 8,9 - dimethoxy - 6,6 - dioxo - 1,2,3,11,12,12a-hexahydro-4H-pyrido-[1,2-b]-[1,2,5]-benzothiadiazepine.
20. 9 - methoxy - 6,6 - dioxo - 1,2,3,11,12,12a - hexahydro-4H-pyrido-[1,2-b]-[1,2,5]-benzothiadiazepine.
21. 8,9 - methylenedioxy - 6,6, - dioxo-1,2,3,11,12,12a-hexahydro-4H-pyrido-[1,2-b]-[1,2,5]-benzothiadiazepine.
22. 7 - chloro - 6,6 - dioxo - 1,2,3,11,12,12a - hexahydro-4H-pyrido-[1,2-b]-[1,2,5]-benzothiadiazepine.
23. 9 - trifluoromethyl - 6,6 - dioxo - 1,2,3,11,12,12a-hexahydro-4H-pyrido-[1,2-b]-[1,2,5]-benzothiadiazepine.
24. 8 - bromo - 6,6 - dioxo - 1,2,3,11,12,12a - hexahydro-4H-pyrido-[1,2-b]-[1,2,5]-benzothiadiazepine.
25. 8 - chloro - 6,6 - dioxo - 1,2,3,11,12,12a - hexahydro-4H-pyrido-[1,2-b]-[1,2,5]-benzothiadiazepine.
26. A process for making a compound of the formula

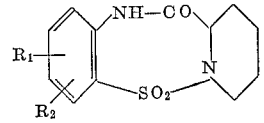

wherein $R_1$ and $R_2$ are each members selected from the group consisting of hydrogen, halogen, trifluoromethyl, lower alkyl, lower alkoxy and methylenedioxy which comprises refluxing with a compound selected from the group consisting of phosphorus trichloride, phosphorus pentachloride, and thionyl chloride a compound of the formula

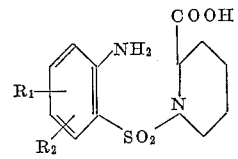

wherein $R_1$ and $R_2$ have the same meanings indicated hereinabove.

27. A process for making a compound of the formula

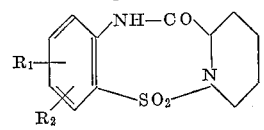

wherein $R_1$ and $R_2$ are each members selected from the group consisting of hydrogen, halogen, trifluoromethyl, nitro, amino, lower alkyl, lower alkoxy and methylenedioxy which comprises refluxing with a strong base a compound of the formula

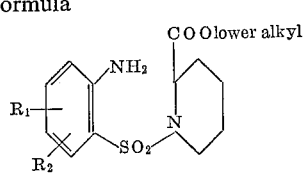

wherein $R_1$ and $R_2$ have the same meanings indicated hereinabove.

28. A process according to claim 27, wherein said strong base is butyl lithium.
29. A process according to claim 27, wherein said strong base is sodium hydride.
30. A process for making a compound of the formula

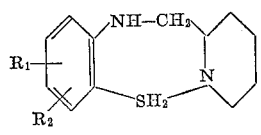

wherein $R_1$ and $R_2$ each are a member selected from the group consisting of hydrogen, halogen, trifluoromethyl, lower alkyl, lower alkoxy, and methylenedioxy, which comprises reducing a compound of the formula

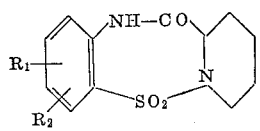

wherein $R_1$ and $R_2$ have the meaning given above, with diborane.

31. A process for making a compound of the formula

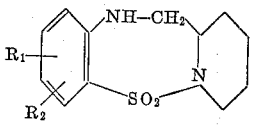

wherein $R_1$ and $R_2$ each are a member selected from the group consisting of hydrogen, halogen, trifluoromethyl, lower alkyl, lower alkoxy, and methylenedioxy, which comprises refluxing a compound of the formula

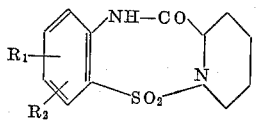

with phosphorous pentasulfide and pyridine to form a thioamide compound of the formula

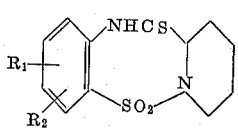

wherein $R_1$ and $R_2$ have the meanings given above, and thereafter converting said thioamide compound to the desired amine compound by refluxing with Raney nickel.

32. A process for making a compound of the formula

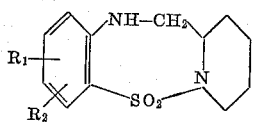

wherein $R_1$ and $R_2$ each are a member selected from the group consisting of hydrogen, halogen, trifluoromethyl, lower alkyl, lower alkoxy, and methylenedioxy, which comprises treating a compound of the formula

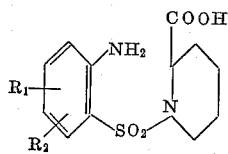

wherein $R_1$ and $R_2$ have the meaning given above, with diborane.

33. A process as claimed in claim 26 wherein the compound of the formula

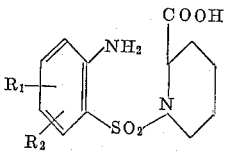

is refluxed with thionyl chloride.

34. A process for making a compound of the formula

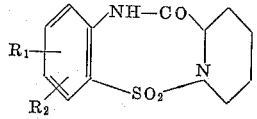

wherein $R_1$ and $R_2$ are each members selected from the group consisting of hydrogen, halogen, trifluoromethyl, lower alkyl, lower alkoxy and methylenedioxy which comprises saponifying a compound of the formula

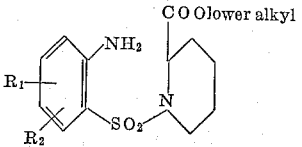

wherein $R_1$ and $R_2$ have the meanings given above, and refluxing the acid formed thereby with a compound selected from the group consisting of phosphorous chloride, phosphorous pentachloride and thionyl chloride.

35. A compound of the formula

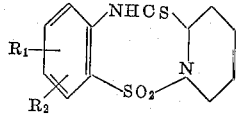

wherein $R_1$ and $R_2$ each are members selected from the group consisting of hydrogen, halogen, trifluoromethyl, lower alkyl, lower alkoxy, and methylenedioxy.

36. 9 - chloro - 6,6 - dioxo - 12 - thio - 1,2,3,11,12,12a - hexahydro - 4H - pyrido - [1,2 - b] - [1,2,5] - benzothiadiazepine.

37. The method of making 8 - amino - 6,6,12 - trioxo-1,2,3,11,12,12a - hexahydro - 4H - pyrido - [1,2 - b] - [1,2,5] - benzothiadiazepine which comprises nitrating 6,6,12 - trioxo - 1,2,3,11,12,12a - hexahydro - 4H - pyrido [1,2 - b] - [1,2,5] - benzothiadiazepine and reducing the resulting nitro compound.

No references cited.

WALTER A. MODANCE, *Primary Examiner.*

R. T. BOND, *Assistant Examiner.*

UNITED STATES PATENT OFFICE
CERTIFICATE OF CORRECTION

Patent No. 3,341,520                          September 12, 1967

Heinz Arthur Pfenninger

It is hereby certified that error appears in the above numbered patent requiring correction and that the said Letters Patent should read as corrected below.

Column 9, line 17, for "the" read -- then --; column 10, line 53, for "BENZOTHIADIAZEPINE" read -- BENZOTHIADIAZEPINES --; column 14, line 43, for "EXAMPLE XXIV" read -- EXAMPLE XXXIV --; column 15, line 60, for "bonontrifluoride" read -- borontrifluoride --; column 20, lines 60 to 65, for that portion of the formula reading $\diagdown SH_2 \diagup$          read          $\diagdown SO_2 \diagup$ Signed and sealed this 5th day of November 1968.

(SEAL)
Attest:

EDWARD M. FLETCHER, JR.               EDWARD J. BRENNER
Attesting Officer                     Commissioner of Patents